United States Patent
De Jong et al.

[11] Patent Number: 5,161,886
[45] Date of Patent: Nov. 10, 1992

[54] METHOD FOR THE PERSPECTIVE DISPLAY OF A PART OF A TOPOGRAPHIC MAP, AND DEVICE SUITABLE FOR PERFORMING SUCH A METHOD

[75] Inventors: Durk J. De Jong; Timothy J. Everett, both of Eindhoven, Netherlands

[73] Assignee: U.S. Philips Corp., New York, N.Y.

[21] Appl. No.: 798,264

[22] Filed: Nov. 18, 1991

Related U.S. Application Data

[63] Continuation of Ser. No. 463,696, Jan. 11, 1990, abandoned.

[30] Foreign Application Priority Data

Jan. 11, 1989 [NL] Netherlands ............... 8900056

[51] Int. Cl.⁵ .............................................. G06F 15/50
[52] U.S. Cl. ...................... 364/449; 364/443; 340/729; 340/995
[58] Field of Search ............ 364/443, 449; 340/729, 340/990, 995

[56] References Cited

U.S. PATENT DOCUMENTS

| | | | |
|---|---|---|---|
| 4,489,389 | 12/1984 | Beckwith et al. | 364/522 |
| 4,737,916 | 4/1988 | Ogawa et al. | 340/990 |
| 4,744,033 | 5/1988 | Ogawa et al. | 340/990 |
| 4,796,189 | 1/1989 | Nakayama et al. | 364/449 |
| 4,896,154 | 1/1990 | Factor et al. | 340/995 |
| 4,903,211 | 2/1990 | Ando | 364/443 |
| 4,937,570 | 6/1990 | Matsukawa et al. | 340/905 |
| 4,951,213 | 8/1990 | Baxter et al. | 364/456 |

FOREIGN PATENT DOCUMENTS 2610752 8/1988 France.

OTHER PUBLICATIONS

"IRIS Series 2000: A Technical Overview", Silicon Graphics Computer Systems, date unknown.
"Fast Forward Engineering Workstations: The Iris Series 2000", Silicon Graphics Computer Systems, date unknown.

*Primary Examiner*—Thomas G. Black
*Attorney, Agent, or Firm*—Jack D. Slobod

[57] ABSTRACT

A method and device for the perspective display of a portion of topographic coordinate information of points on the surface of the earth proximate to the current position of a vehicle travelling thereon, utilizes a coordinate transformation to generate a perspective image from an apparent point of view above and behind the vehicle in a viewing direction, which, with the direction of travel of the vehicle, defines an imaginary plane which is perpendicular to the surface of the earth.

20 Claims, 3 Drawing Sheets

METHOD FOR THE PERSPECTIVE DISPLAY OF A PART OF A TOPOGRAPHIC MAP, AND DEVICE SUITABLE FOR PERFORMING SUCH A METHOD

This is a continuation of application Ser. No. 07/463,696 filed Jan. 11, 1990 now abandoned.

BACKGROUND OF THE INVENTION

For users of vehicles capable of travelling on the surface of the earth (for example, cars or ships) it is attractive to have topographic information concerning the surroundings at their disposal, in visual form.

The invention relates to a method for the perspective display of a part of a topographic map by selecting, in dependence on a position of a vehicle, topographic information from a data structure, where under the influence of a coordinate transformation the display takes place according to a principal viewing direction which encloses an acute angle with respect to the surface of the earth. The invention also relates to a device suitable for performing such a method. A method of this kind is known from the French patent application No. 2610752. This application discloses a method where a representation of a not necessarily flat terrain, stored in a data structure as a network of nodes, is transposed into a surface extending through the constituent nodes by interpolation, said surface being projected onto an auxiliary plane. A map or photograph of the terrain, containing colour information, is superposed on the surface and projected onto the auxiliary plane. A perspective image of the terrain is thus obtained, "dressed up" with the colour information from the map or photograph. This supplies, for example, a pilot with information about the terrain he is flying over. It is a drawback of such a method that the supply of information to a user is always limited to the image he would personally perceive in ideal circumstances.

SUMMARY OF THE INVENTION

It is inter alia an object of the invention to provide a simple method for the perspective display of a part of a topographic map which is user friendly and which provides the user with more information about the terrain in or over which he moves than the information he has at his disposal from his point of view. To achieve this, the invention is characterized in that the topographic information includes coordinates of points in a part of a substantially two-dimensionally represented surface of the earth, on which the vehicle is capable of travelling, the part of the map being displayed, under the influence of the coordinate transformation, in a central projection from an apparent point of view which is situated outside the vehicle and above the relevant part of the surface of the earth. Thus, the user obtains a better and more readily recognizable impression of the surroundings, i.e. a "bird's eye view" as it were. In other words, the user obtains, apart from the information he perceives from his point of view, extra information, which he could not possibly obtain from his position in the vehicle. It is of essential importance that the starting material defines a two-dimensional situation whereto an apparent, third dimension which is attractive on subjective grounds is added. The principal direction corresponds to an apparent viewing direction.

The central projection, where all points of a figure to be projected are connected to a fixed point (the projection centre) via connecting lines intersected by a projection plane, produces a very faithful image from a subjective point of view. In this case the principal direction is usually a line in the plane which vertically divides the image in half at right angles. A parallel projection (as known, for example from mechanical drawings) parallel to the principal direction is slightly less faithful. The advantage of the latter approach consists in that all calculations are simpler and hence faster. Other projection methods are also feasible, notably a combination of central and parallel projection: for example, parallel projection in the horizontal direction and central projection in the vertical direction. Any projection method producing a spatial effect can in principle be used.

One version of a method in accordance with the invention is characterized in that the position of the apparent point of view relative to the current position of the vehicle is fixed. Operation thus becomes more user-friendly, since the point of view moves as the user moves.

A further version of a method in accordance with the invention is characterized in that the apparent point of view is situated to the rear of the vehicle, the viewing direction and a direction of travel of the vehicle defining an imaginary plane extending perpendicularly to the surface of the earth. Thus, the part of the map where the vehicle is actually present is always displayed: the point of view is located to the rear of the vehicle, in the prolongation of the direction of travel.

A further version of a method in accordance with the invention is characterized in that the coordinate transformation includes a rotation through an angle a(t) which makes a predetermined direction in the image permanently coincident at least substantially with a direction of travel of the vehicle. It is thus achieved that the viewing direction from the apparent point of view extends substantially in the elongation of the direction of travel of the vehicle, so that the direction most relevant to the user is displayed.

A further version of a method in accordance with the invention is characterized in that the position of the vehicle on the map is displayed. The user can thus directly recognise the actual position.

Another version of a method in accordance with the invention is characterized in that a change of the angle a(t) between successive images in time is limited to a predetermined value. As a result, when the direction of the travel of the vehicle changes, the viewing direction will not change so quickly that a user could become disoriented.

A further version of a method in accordance with the invention is characterized in that from the selected information items to be displayed are determined by a further selection operation. This offers the advantage that a more user friendly display is realised by the omission of less relevant information. Moreover, successive images can be generated more quickly.

A further version of a method in accordance with the invention is characterized in that an apparent point of view, occupying a relative position with respect to a current position of the vehicle, can be shifted to a corresponding relative position with respect to a point which is situated at an adjustable geographic distance from the current position on a given route which departs from the current position. The given route is, for example, an optimum route planned by a route planner. Thus, a user can obtain an impression of the surroundings some distance further down the route being followed. Another version of a method in accordance with the invention is characterized in that the apparent point of view is displaceable, in dependence on a fictitiously increased speed of travel of the vehicle along a given route from the current position of the vehicle. This offers the advantage that the user can already "scout" route segments yet to be travelled by simulating a fictitiously higher speed so that the current position of the vehicle along the route segment changes more quickly than in reality. A further version of a method in accordance with the invention is characterized in that a viewing direction from an apparent point of view of adjustable. Thus, a user can also look "backwards".

The invention also relates to a device suitable for performing such a method, which device in accordance with the invention is characterized in that it comprises a memory for the storage of topographic information, detection means for the (repeated) determination of the position of the vehicle, first selection means for (repeatedly) selecting, on the basis of the position of the vehicle, a relevant part of the topographic information by performing at least a first selection operation, transformation means for (repeatedly) performing the coordinate transformation on the selected information, and display means for the (repeated) perspective display of the image produced by the transformation. Such a device can be simply incorporated in the further auxiliaries available to the driver of a car etc., for example a route planning navigation system.

Other attractive aspects of the invention are disclosed in further dependent Claims.

BRIEF DESCRIPTION OF THE FIGURES

The invention will be described in detail hereinafter with reference to some Figures. Therein.

DESCRIPTION OF A PREFERRED EMBODIMENT

Figure 1:
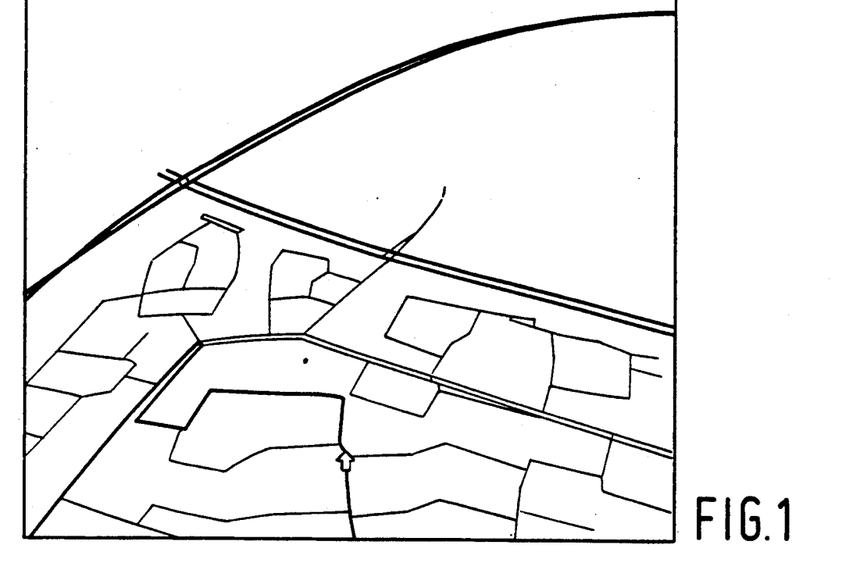
FIG. 1 is a perspective representation of a part of a map.

FIG. 1 is a perspective representation of a part of a topographic map. The topographic data is stored in a memory, for example a CD-ROM. The image shown in FIG. 1 is produced by a microprocessor which calculates the current position of the vehicle on the basis of data supplied by sensors, selects a relevant part of the topographic data from the memory and performs the coordinate transformation. The driver can select a current position by hand. Coordinate transformations for perspective representation are known per se and so is the equipment for performing such transformations. FIG. 1 was generated using a Silicon Graphics IRIS workstation. In this respect reference is made to the leaflet "IRIS Series 2000: A Technical Overview", Silicon Graphics Computer Systems, Corporate Office Western Region, 630 Clyde Court, Mountain View, Calif. 94043, and also to the leaflet "Fast forward engineering workstations: The IRIS Series 2000".

Figure 2A:
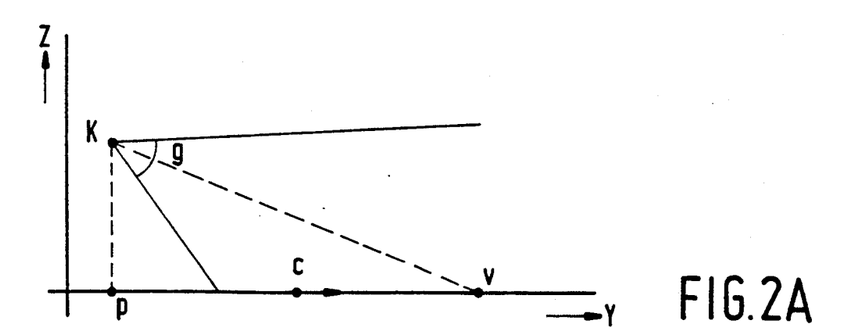
FIGS. 2A and 2B illustrate a coordinate transformation.
Figure 2B:
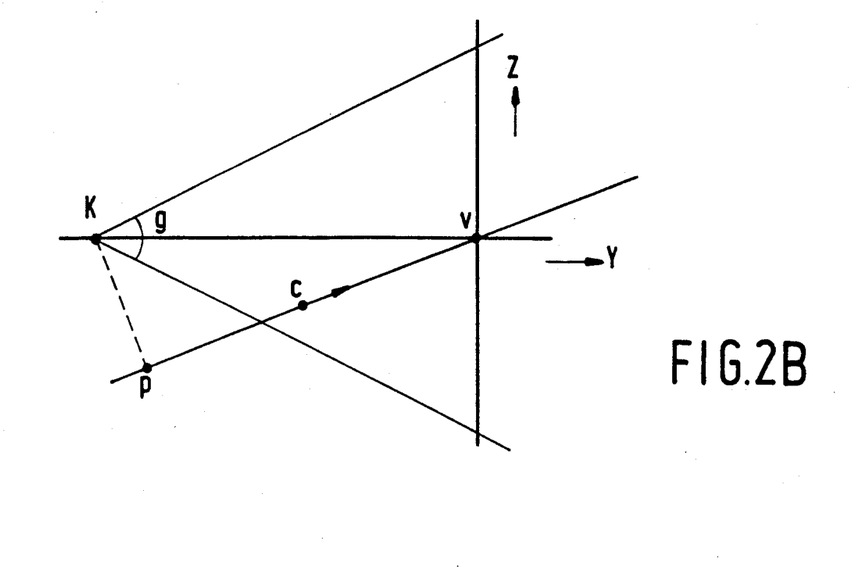

The coordinate transformation applied therein will be described with reference to FIG. 2.

A topographic map in the X-Y plane is first translated so that the current position of the vehicle is situated in the origin. Subsequently, a rotation is performed around the Z-axis through an angle such that the direction of travel of the vehicle coincides with the Y-axis. The coordinate transformations necessary to achieve this are generally known. The situation thus obtained is shown in FIG. 2A. The Y-axis extends from left to right. The X-axis extends perpendicularly to the plane of drawing, the positive direction pointing forwards. The Z-axis has been shifted slightly to the left for the sake of clarity, but actually extends through the point C: the current position of the vehicle. Above a point P, also being situated on the Y-axis, there is selected an apparent point of view K. On the Y-axis there is also selected a further point V which determines the axis of the viewing direction (the principal direction) in conjunction with the point K. Finally there is also selected a viewing angle g (both in the Y-Z plane and in the plane through the points K and V and parallel to the X-axis; these angles need not necessarily be equal). The spatial dimension of the angle g is adapted to the display member used; it will usually form the apex of a pyramid which is equilateral or not.

Subsequently, a translation is performed which shifts the point V to the origin. Subsequently, a rotation is performed about the X-axis through an angle such that the line through the points K and V coincides with the Y-axis. The coordinate transformations realising this are again well known, see FIG. 2B. Finally, a perspective projection is performed, the plane determined by the X-axis and the line through the points C and P being projected onto a plane perpendicular to the Y-axis, for example the plane Y=O. To this end, for each point of the plane to be projected which is situated within the viewing angle g, viewed from the point K, the connecting line to the point K is intersected by the plane on which projection takes place. The relevant coordinate transformation is generally known.

This projection method is the so-called central projection method. Other projection methods are also feasible, notably the parallel projection method where parallel lines remain parallel. This projection method on the one hand offers the advantage that the coordinate transformation is simpler so that a perspective map display can be realised faster, but on the other hand has the drawback that a substantially smaller amount of information is given in each image because of the absence of radial compression of the information. Therefore, in the case of parallel projection horizons are never displayed but the image is cut off at the "upper" side. In the case of central projection a horizon (real or not) appears, depending on the situation of the upper leg of the vertical viewing angle. Furthermore, the display obtained via parallel projection is subjectively experienced to be less clear and hence less user friendly than the central projection.

FIG. 1 concerns a city map for which the following parameters have been chosen: altitude KP of the apparent point of view is 500 meters. Furthermore the point of view is situated above the point P on the surface of the earth which is situated 600 meters behind the current position C of the vehicle, substantially in the elongation of the direction of travel of the vehicle. The viewing direction is chosen so that the point V on the surface of the earth, being situated 600 meters in front of the current position C of the vehicle, substantially in the elongation of the direction of travel of the vehicle, appears always substantially in the centre of the display. The viewing angle g is chosen to be 50 degrees horizontally as well as vertically.

The current position of the vehicle is clearly indicated by the arrow. There are also indicated an intended route for the vehicle and three categories of roads: a main lane from the centre left to the top right of the image, a secondary road from the centre left to the bottom right, and in the foreground a network of side streets.

Figure 3:
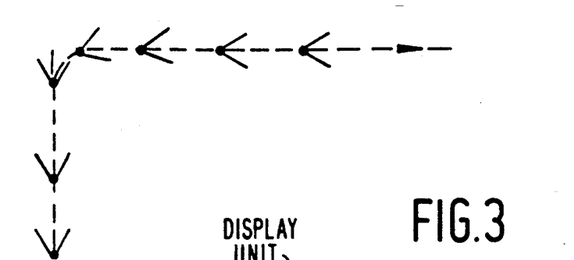
FIG. 3 illustrates the restriction of the change of the viewing angle.

The microprocessor generates successive perspective images with a frequency of approximately 1 image per second when all topographic information of the area selected from the memory is displayed. Thus, every second a new image which has been adapted to the current position and direction of the vehicle appears on the display screen of the user. In the case of a sudden change of direction of the vehicle, successive images could deviate from one another to such an extent that the user could become disoriented. Therefore, the change of the angle wherethrough rotation takes place in order to make the direction of travel coincide with the viewing direction is limited to a value of, for example at the most 15 degrees between two successive images. Thus, upon turning a corner the user will observe images which originate from more or less continuously varying directions, see FIG. 3. This Figure is an orthogonal plan view of a route segment of a vehicle (denoted by the dotted, arrow-like line segment). In various locations a V-shaped symbol indicates the viewing angle used for the perspective display at that area. When a corner is turned, the viewing direction is not automatically made to coincide with the direction of travel, but is gradually adapted thereto. Because of this lagging of the viewing direction with respect to the direction of travel, the interpretation of the display will be easier from a subjective point of view.

Figure 4A:
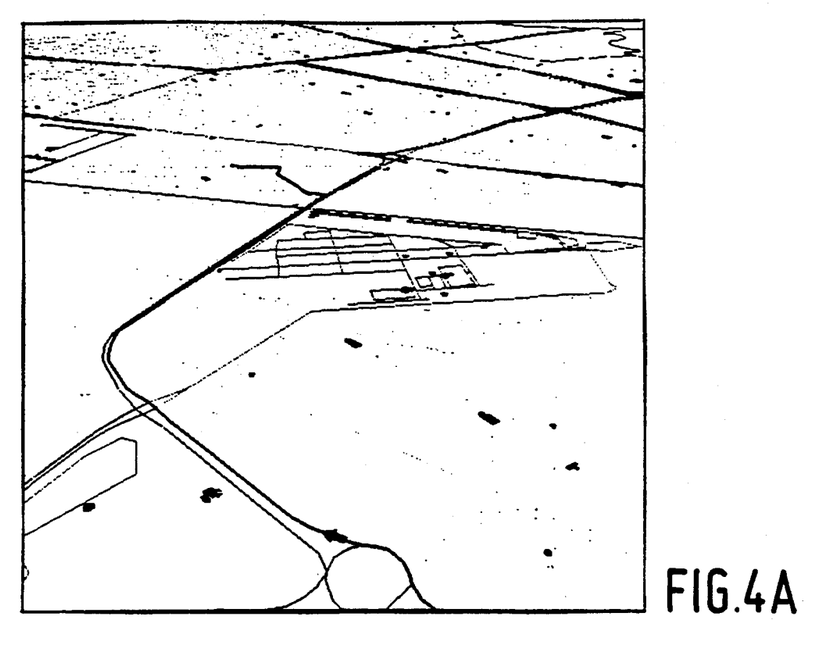
FIG. 4A is a further perspective representation of a part of a map.
Figure 4B:
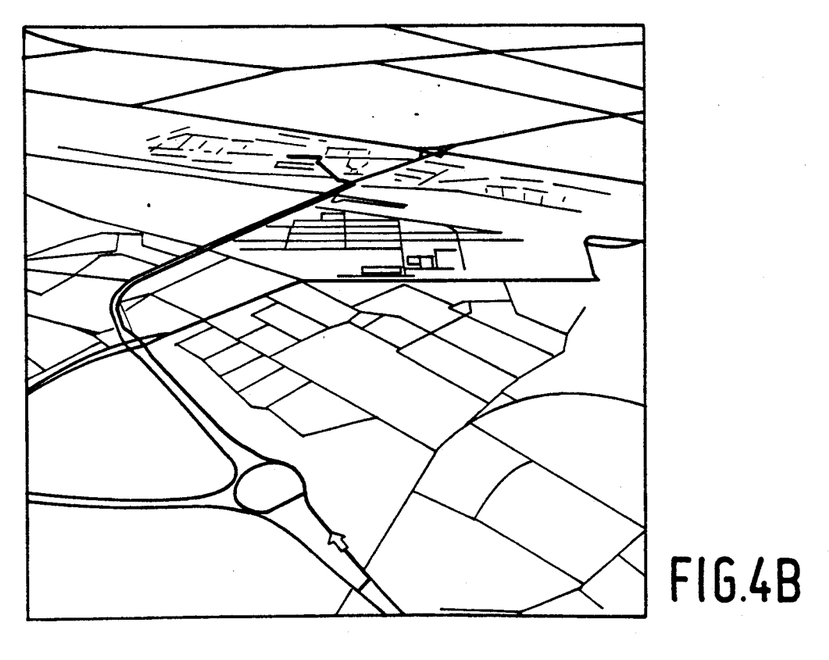
FIG. 4B is a third representation of a part of a map.

FIG. 4A is a perspective representation of a part of a topographic map where all topographic information of the area selected from the memory is displayed. This information includes streets, intersections, a roundabout, characteristic points such as churches, monuments, etc. The strongly reduced items near the horizon offer the user little information. FIG. 4B is a more or less comparable representation in which notably the vehicle has meanwhile passed the roundabout at the foreground. The orientation of the two images is such that the direction between the starting point of the route (briefly before the first image) and the intended terminal point of the route (at the top centre in the image) originally extended vertically while the orientation is maintained. Another difference between the first and the second image consists in that FIG. 4B has been formed after a further selection from the selected information. As a result of the omission of irrelevant information, an image is obtained which contains substantially the same amount of relevant information for the user and which can be more quickly interpreted. An additional advantage of this further selection consists in that the microprocessor can increase the frequency of generation of images by a factor 6 to approximately 6 Hz.

An obvious criterion for the further selection is formed by the geographic distance between items to be displayed and the current position of the vehicle. It is advisable, however, to display important traffic routes even when they extend beyond a given selection threshold. Therefore, if the topographic information obtained in advance for each item includes an index which indicates the traffic relevance, such an index forms a further criterion for the further selection. Items of high traffic relevance are always displayed whilst items of low traffic significance are omitted, even when they are situated in the direct vicinity of the current position of the vehicle.

When the vehicle comprises a navigation system which determines an optimum route for the vehicle with a given starting point and a destination, the distance between the items to be displayed and the optimum route determined by the navigation system forms a further criterion for the further selection. The route is displayed, for example in a given, contrasting colour, and so are items which are situated in the vicinity of the route to be travelled. The starting point and the destination can also be included in the perspective representation, for example by way of a contrasting colour or a distinct symbol which may appear to project upwards from the plane to be projected in the perspective image.

When the navigation system is of a kind such that the calculation of the optimum route requires a comparatively long period of time (i.e. too much time for the user to wait: the driver already starts to travel while the navigation system is still calculating) a further criterion for the further selection is formed by the presence of the items to be displayed in a given part of a tree structure with possible optimum sub-routes, said tree structure being generated by the navigation system. While the microprocessor calculates the optimum route, a provisionally optimum sub-route is displayed and also items which constitute other sub-routes and which are situated, for example not more than 10 branches deep in the tree structure.

The chosen altitude of the apparent point of view can be rendered dependent on the instantaneous speed of the vehicle. In the case of a high speed, a suitable overview over a large area is desirable. Therefore, the altitude is increased as the speed is higher.

If the topographic information includes an index indicating the traffic relevance for each route or sub-route, the altitude of the apparent point of view may be chosen to be dependent on this index. If the vehicle travels along an important traffic route, the altitude is higher than when the vehicle travels along an unimportant (for example, narrow or curved) route.

The change of the altitude of the apparent point of view between two successive images can be limited to a given value, for example to at the most 20 meters. As a result, the user experiences a more or less continuous change of altitude when the speed changes or when the traffic relevance of the route followed changes.

By temporarily adopting a fictitiously higher speed of the vehicle, it can be simulated that the current position of the vehicle along the route to be followed changes more quickly than in reality, for example three times as fast. The user can thus already "scout" a part of the route yet to be travelled.

Figure 5:
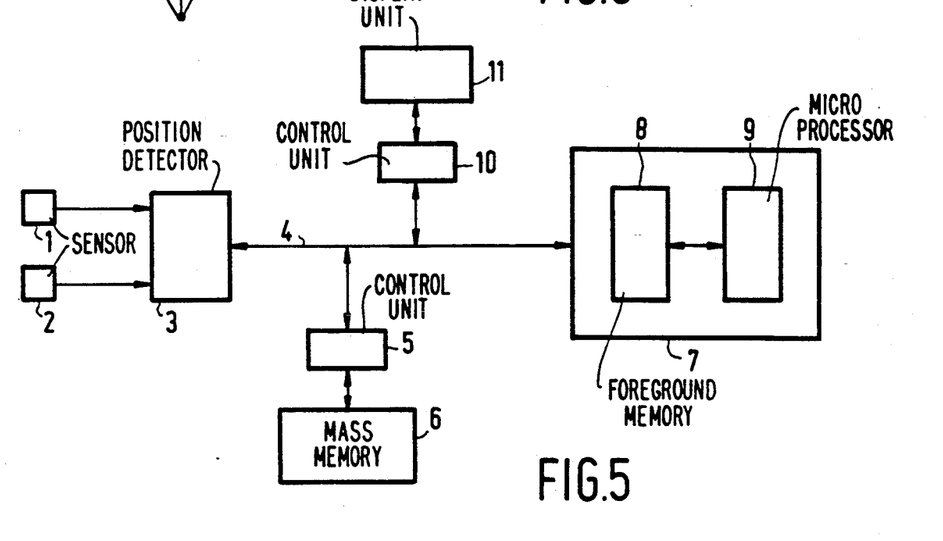
FIG. 5 shows a device for the perspective display of a part of a map.

FIG. 5 shows a device which is suitable for generating a perspective view of surroundings of the vehicle. Sensors 1 and 2 supply measuring data (for example the instantaneous tractive wheel velocity and the instantaneous steering angle) to the detection means 3 which determine a current position of the vehicle on the basis thereof. This determination of the position, however, can also be realised by the reception of external data, for example from a satellite or another transmitter supplying measuring data.

A bus 4 acts as a signal path and supplies, via a control unit 5, a mass memory 6 with a selection signal so that the processor 7, comprising a foreground memory 8 and a microprocessor 9, receives a relevant sub-set of topographic information. Via coordinate transformation, the microprocessor 9 produces a perspective image of the part of the map which is applied to the display unit 11, comprising an image memory, via a control unit 10.

If desirable, the microprocessor 9 can temporarily supply, via the bus 4, the detection means 3 with a non-real, but simulated variation of the current position, obtained by a fictitiously higher speed of travel.

Figure 6:
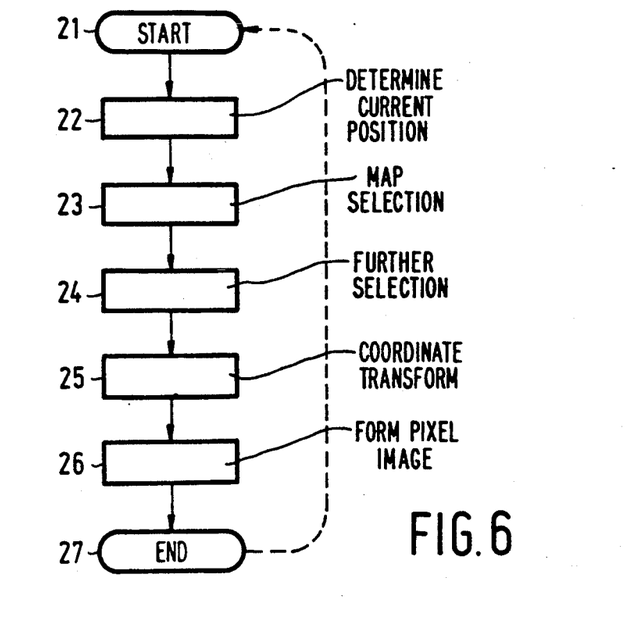
FIG. 6 shows a flowchart illustrating the operation of the device.

FIG. 6 shows a flowchart illustrating the determination of a perspective image. A start is made in block 21. In block 22 a current position is determined. In block 23 a relevant part of the map is selected and applied to the foreground memory. If desirable, in block 24 a further selection is performed on the selected information on the basis of, for example, the geographic distance from the current position of the vehicle and the relevance of the items to be displayed. This block also may be skipped. In block 25 the coordinate transformation is performed on the information ultimately selected. This procedure takes into account, if applicable, the limitation to a maximum value of the change of the angle between successive images wherethrough a rotation constituting the coordinate transformation takes place in order to make the viewing direction coincide with the direction of travel of the vehicle. In block 26 the transformation result is pixel-wise applied to the image memory in the display element. In block 27 the display is completed and a new start may be made.

We claim:

1. A method for the perspective display of a portion of topographic information of the surface of the earth including a surface portion on which a vehicle is capable of travelling, comprising:
   maintaining a data structure of topographic information of coordinates of points on the surface of the earth;
   selecting from said data structure a portion of the topographic information for display dependent on a current position of the vehicle on said surface portion;
   determining a position of an apparent point of view and viewing direction for said display, said apparent point of view being outside of the vehicle and above the position of the vehicle;
   performing a coordinate transformation of said selected topographic information to represent said selected information as would be seen from said apparent point of view in said viewing direction, and
   displaying within said vehicle said selected transformed topographic information as a perspective image.

2. A method as claimed in claim 1 comprising fixing the position of the apparent point of view relative to the current position of the vehicle.

3. A method as claimed in claim 1, comprising situating the apparent point of view to the rear of the vehicle, the viewing direction and a direction of travel of the vehicle defining an imaginary plane extending perpendicularly to the surface of the earth.

4. A method as claimed in claim 3 comprising limiting the change of the angle a(t) between successive images in time to a predetermined value.

5. A method as claimed in claim 1, comprising displaying the position of the vehicle on the map.

6. A method as claimed in claim 1, in which the coordinate transformation includes a rotation through an angle a(t) which makes a predetermined direction in the image permanently coincident at least substantially with a direction of travel of the vehicle.

7. A method as claimed in claim 1, comprising a further selection from the selected information items to be displayed.

8. A method as claimed in claim 7, in which the further selection is based how far the items are located from the current position of the vehicle.

9. A method as claimed in claim 7, in which the further selection is based on an index of the items.

10. A method as claimed in claim 7, comprising determining an optimum route or the vehicle by a route planner, and in which the further selection is based on the distance between the items and the optimum route.

11. A method as claimed in claim 7, where the route planner generates a tree structure with feasible routes, and in which the further selection is based on the presence of the items in a predetermined part of the tree structure.

12. A method as claimed in claim 1, in which the altitude of the apparent point of view depends on the speed of the vehicle.

13. A method as claimed in claim 12, comprising limiting the change of the altitude of the apparent point of view between successive images to a predetermined value.

14. A method as claimed in claim 1, comprising determining the altitude of the apparent point of view based on an index which indicates a category of a route segment in which the vehicle is present.

15. A method as claimed in claim 1, comprising shifting an apparent point of view, occupying a relative position with respect to a current position of the vehicle, to a corresponding relative position with respect to a point which is situated at an adjustable geographic distance from the current position on a given route which departs from the current position.

16. A method as claimed in claim 15, comprising shifting the apparent point of view, in dependence on a fictitiously increased speed of travel of the vehicle along a given route from the current position of the vehicle.

17. A method as claimed in claim 1, comprising adjusting a viewing direction from an apparent point of view.

18. A device for perspective topographic display of successive images in relation to the position of a vehicle a surface comprising: a memory for the storage of topographic coordinate information of the surface, means for the determination of the position of the vehicle on the surface, first selection means for selecting, on the basis of the position of the vehicle, topographic sub-information from the topographic information by performing at least a first selection operation, transformation means for performing a coordinate transformation on the selected sub-information, in a projection from an apparent point of view, outside of the vehicle and above the current position of the vehicle, and display means for the display within the vehicle of a perspective image produced by the transformation.

19. A device as claimed in claim 18 comprising means for limiting the change, between successive images, of an angle a(t) wherethrough a rotation takes place during the coordinate transformation in order to make a predetermined viewing direction in the display permanently coincident at least substantially with a direction of travel of the vehicle.

20. A device as claimed in claim 18 comprising second selection means for performing a further selection operation on the sub-information selected by the first selection means.

* * * * *

(12) REEXAMINATION CERTIFICATE (4473rd)

United States Patent
De Jong et al.

(10) Number: US 5,161,886 C1
(45) Certificate Issued: Oct. 30, 2001

(54) METHOD FOR THE PERSPECTIVE DISPLAY OF A PART OF A TOPOGRAPHIC MAP, AND DEVICE SUITABLE FOR PERFORMING SUCH A METHOD

(75) Inventors: Durk J. De Jong; Timothy J. Everett, both of Eindhoven (NL)

(73) Assignee: U.S. Philips Corporation, New York, NY (US)

Reexamination Request:
No. 90/005,939, Feb. 27, 2001

Reexamination Certificate for:
Patent No.: 5,161,886
Issued: Nov. 10, 1992
Appl. No.: 07/798,264
Filed: Nov. 18, 1991

Related U.S. Application Data (63) Continuation of application No. 07/463,696, filed on Jan. 11, 1990, now abandoned.

(30) Foreign Application Priority Data

Jan. 11, 1989 (NL) .................................................. 8900056

(51) Int. Cl.$^7$ .......................... G01C 21/20; G08G 1/133
(52) U.S. Cl. ........................ 701/209; 701/200; 340/995; 345/440.1

(56) References Cited

U.S. PATENT DOCUMENTS

| | | | |
|---|---|---|---|
| 4,054,917 | 10/1977 | Race | 358/104 |
| 4,384,338 | 5/1983 | Bennett | 364/522 |
| 4,489,389 * | 12/1984 | Beckwith et al. | 364/522 |
| 4,737,916 * | 4/1988 | Ogawa et al. | 340/990 |
| 4,744,033 * | 5/1988 | Ogawa et al. | 340/990 |
| 4,796,189 * | 1/1989 | Nakayama et al. | 364/449 |
| 4,807,158 | 2/1989 | Blanton et al. | 364/521 |
| 4,890,104 | 12/1989 | Takanabe et al. | 340/995 |
| 4,896,154 * | 1/1990 | Factor et al. | 340/995 |
| 4,903,211 * | 2/1990 | Ando | 364/443 |
| 4,937,570 * | 6/1990 | Matsukawa et al. | 340/905 |
| 4,951,213 * | 8/1990 | Baxter et al. | 364/456 |
| 4,970,682 | 11/1990 | Beckwith, Jr. et al. | 364/900 |

FOREIGN PATENT DOCUMENTS

| | | |
|---|---|---|
| 2610752 | 8/1988 | (FR) . |
| 5395727 | 8/1978 | (JP) . |
| 58178213A | 1/1983 | (JP) . |
| 601512A | 1/1985 | (JP) . |
| 60250208A | 12/1985 | (JP) . |
| 6165368 | 4/1986 | (JP) . |
| 6195386 | 5/1986 | (JP) . |
| 61148576A | 7/1986 | (JP) . |
| 6298500 | 5/1987 | (JP) . |
| 62151713A | 7/1987 | (JP) . |
| 62151884A | 7/1987 | (JP) . |
| 62154099A | 7/1987 | (JP) . |
| 62243029A | 10/1987 | (JP) . |
| 6354091 | 3/1988 | (JP) . |
| 63200182A | 8/1988 | (JP) . |
| 63217285A | 9/1988 | (JP) . |
| 63249010A | 10/1988 | (JP) . |
| 63256813A | 10/1988 | (JP) . |
| 63295914A | 12/1988 | (JP) . |
| 1263688 | 10/1989 | (JP) . |

OTHER PUBLICATIONS

Pixel No. 59. CAD/CAM/CAE, Published in Computer Graphic Magazine. (Trans. enc.).
"IRIS Series 2000: A Technical Overview", Silicon Graphics Computer Systems, date unknown.
"Fast Forward Engineering Workstations: The Iris Series 2000", Silicon Graphics Computer Systems, date unknown.

* cited by examiner

*Primary Examiner*—Michael J. Zanelli (57) ABSTRACT

A method and device for the perspective display of a portion of topographic coordinate information of points on the surface of the earth proximate to the current position of a vehicle travelling thereon, utilizes a coordinate transformation to generate a perspective image from an apparent point of view above and behind the vehicle in a viewing direction, which, with the direction of travel of the vehicle, defines an imaginary plane which is perpendicular to the surface of the earth.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

* * * * *

US005161886C2

(12) EX PARTE REEXAMINATION CERTIFICATE (4995th)
United States Patent
De Jong et al.

(10) Number: US 5,161,886 C2
(45) Certificate Issued: Oct. 5, 2004

(54) METHOD FOR THE PERSPECTIVE DISPLAY OF A PART OF A TOPOGRAPHIC MAP, AND DEVICE SUITABLE FOR PERFORMING SUCH A METHOD

(75) Inventors: Durk J. De Jong, Eindhoven (NL); Timothy J. Everett, Eindhoven (NL)

(73) Assignee: U.S. Philips Corporation, New York, NY (US)

Reexamination Request:
No. 90/006,240, Mar. 8, 2002

Reexamination Certificate for:
Patent No.: 5,161,886
Issued: Nov. 10, 1992
Appl. No.: 07/798,264
Filed: Nov. 18, 1991

Reexamination Certificate B1 5,161,886 issued Oct. 30, 2001.

Related U.S. Application Data (63) Continuation of application No. 07/463,696, filed on Jan. 11, 1990, now abandoned.

(30) Foreign Application Priority Data

Jan. 11, 1989 (NL) .............................................. 8900056

(51) Int. Cl.$^7$ ........................ G01C 21/20; G08G 1/133; G06F 15/50
(52) U.S. Cl. .................. 701/209; 701/200; 340/995.17; 345/440.1

(56) References Cited

U.S. PATENT DOCUMENTS

| | | | |
|---|---|---|---|
| 4,368,517 A | 1/1983 | Lovering | 701/16 |
| 4,646,089 A | 2/1987 | Takanabe et al. | 340/995 |
| 4,940,972 A | 7/1990 | Mouchot et al. | 345/421 |
| 4,943,925 A | 7/1990 | Moroto et al. | 701/211 |
| 4,951,211 A | 8/1990 | De Villeroche | 701/202 |
| 4,970,682 A | 11/1990 | Beckwith, Jr. et al. | 707/1 |
| 5,140,532 A | 8/1992 | Beckwith, Jr. et al. | 358/1.1 |

FOREIGN PATENT DOCUMENTS

| | | |
|---|---|---|
| GB | 2 079 453 A | 1/1982 |
| JP | 57-186111 | 11/1982 |
| JP | 56-178213 | 10/1983 |
| JP | 58-182683 | 10/1983 |
| JP | 58-208619 | 12/1983 |
| JP | 59-201199 | 11/1984 |
| JP | 59-212708 | 12/1984 |
| JP | 59-212709 | 12/1984 |
| JP | 60-45816 | 3/1985 |
| JP | 60-91499 | 5/1985 |
| JP | 60-221900 | 11/1985 |
| JP | 60-230013 | 11/1985 |
| JP | 61-25577 | 2/1986 |
| JP | 61-95386 | 5/1986 |
| JP | 62-93614 | 4/1987 |
| JP | 62-151713 | 7/1987 |
| JP | 62-151881 | 7/1987 |
| JP | 62-164086 | 7/1987 |
| JP | 63-16220 | 1/1988 |
| JP | 63-73111 | 4/1988 |
| JP | 58-101706 | 5/1988 |
| JP | 63-233313 | 9/1988 |

(List continued on next page.)

OTHER PUBLICATIONS

"Application of the Compact Disc in Car Information and Navigation Systems" by Martin L.G. Thoone and Ron M.A.M. Breukers, published in SAE The Engineering Resource for Advancing Mobility, SAE Technical Paper Series: 840156, International Congress & Exposition, Detroit, Michigan, Feb. 27–Mar. 2, 1984.

(List continued on next page.)

*Primary Examiner*—Tan Nguyen (57) ABSTRACT

A method and device for the perspective display of a portion of topographic coordinate information of points on the surface of the earth proximate to the current position of a vehicle travelling thereon, utilizes a coordinate transformation to generate a perspective image from an apparent point of view above and behind the vehicle in a viewing direction, which, with the direction of travel of the vehicle, defines an imaginary plane which is perpendicular to the surface of the earth.

FOREIGN PATENT DOCUMENTS

| | | |
|---|---|---|
| JP | 63-251900 | 10/1988 |
| JP | 63-188517 | 12/1988 |
| JP | 63-300399 | 12/1988 |

OTHER PUBLICATIONS

"Integrated Flying Aid and Mission Displays for Modern Combat Aircraft Incorporating a Digital Database" by A.M. Whitehead, et al., of GEC Avionics, UK, published in Data Dissemination and Display: Electronics in Navigation: NAV 87, Sep. 29–30, Oct. 1, 1987, London/The Royal Institute of Navigation.

"Total Terrain Avionics" by J. Stone of GEC Avionics, UK, published in Data Dissemination and Display: Electronics in Navigation: NAV 87, Sep. 29–30, Oct. 1, 1987, London/The Royal Institute of Navigation.

"Microsoft Flight Simulator Manual", Microsoft Corporation, ver. 3.

"Design technology for electronic navigation system, developments and examples thereof", publication date: May 23, 1988.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 18 are determined to be patentable as amended.

Claims 2–17, 19 and 20, dependent on an amended claim, are determined to be patentable.

1. A method for the perspective display of a portion of topographic information of the surface of the earth including a surface portion on which a vehicle is capable of traveling, comprising:
    maintaining a data structure of topographic information of coordinates of points on the surface of the earth;
    selecting from said data structure a portion of the topographic information for display dependent on a current position of the vehicle on said surface portion;
    determining a position of an apparent point of view and viewing direction for said display, said apparent point of view being outside of the vehicle and above the position of the vehicle;
    performing a coordinate transformation of said selected topographic information to represent said selected information as would be seen from said apparent point of view in said viewing direction, and
    displaying within said vehicle said selected transformed topographic information as a perspective image,
    *wherein said vehicle travels on the surface of the earth.*

18. A device for perspective topographic display of successive images in relation to the position of a vehicle *on* a surface comprising: a memory for the storage of topographic coordinate information of the surface, means for the determination of the position of the vehicle on the surface, first selection means for selecting, on the basis of the position of the vehicle, topographic sub-information from the topographic information by performing at least a first selection operation, transformation means for performing a coordinate transformation on the selected sub-information, in a projection from an apparent point of view, outside of the vehicle and above the current position of the vehicle, and display means for the display within the vehicle of a perspective image produced by the transformation, *wherein said vehicle travels on the surface of the earth.*

* * * * *